Jan. 30, 1962

F. S. LAPEYRE ETAL 3,018,510

SHRIMP PEELING MACHINE

Original Filed Oct. 15, 1957

INVENTORS
F. S. LAPEYRE
J. M. LAPEYRE &
LEROY E. DEMAREST

BY

ATTORNEYS

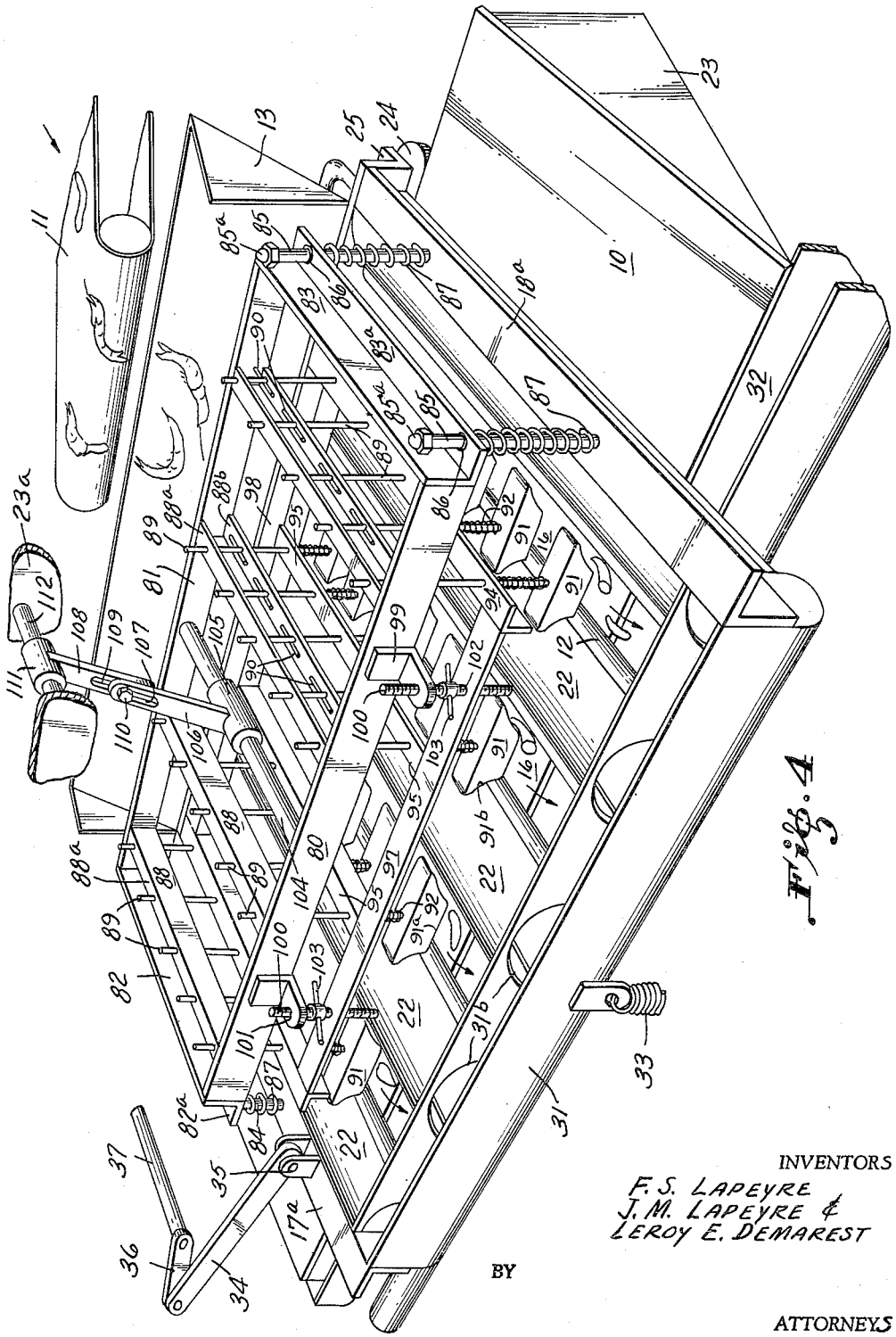

Jan. 30, 1962 F. S. LAPEYRE ETAL 3,018,510
SHRIMP PEELING MACHINE
Original Filed Oct. 15, 1957 5 Sheets-Sheet 4
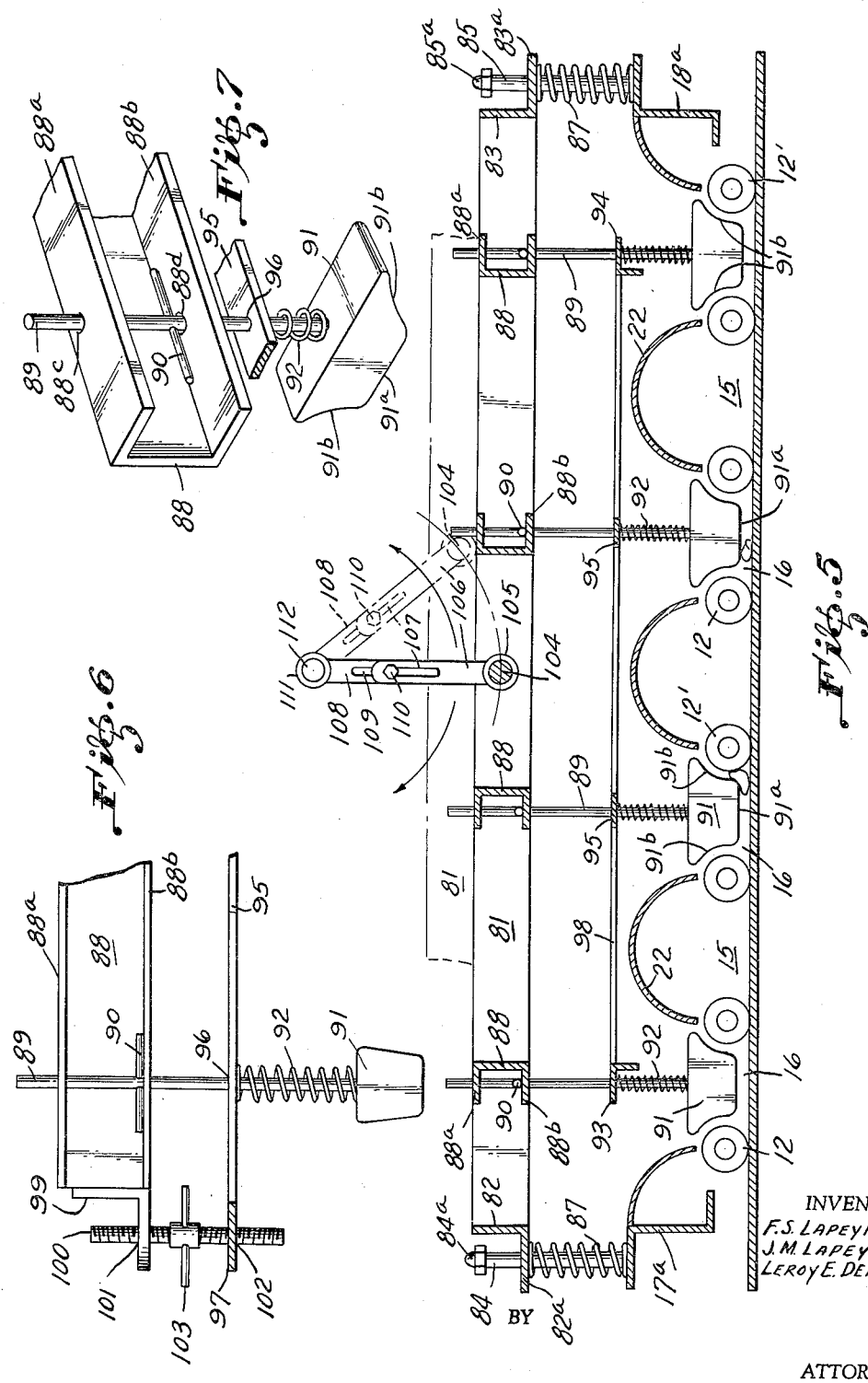
INVENTORS
F.S. LAPEYRE
J.M. LAPEYRE &
LEROY E. DEMAREST
BY
ATTORNEYS

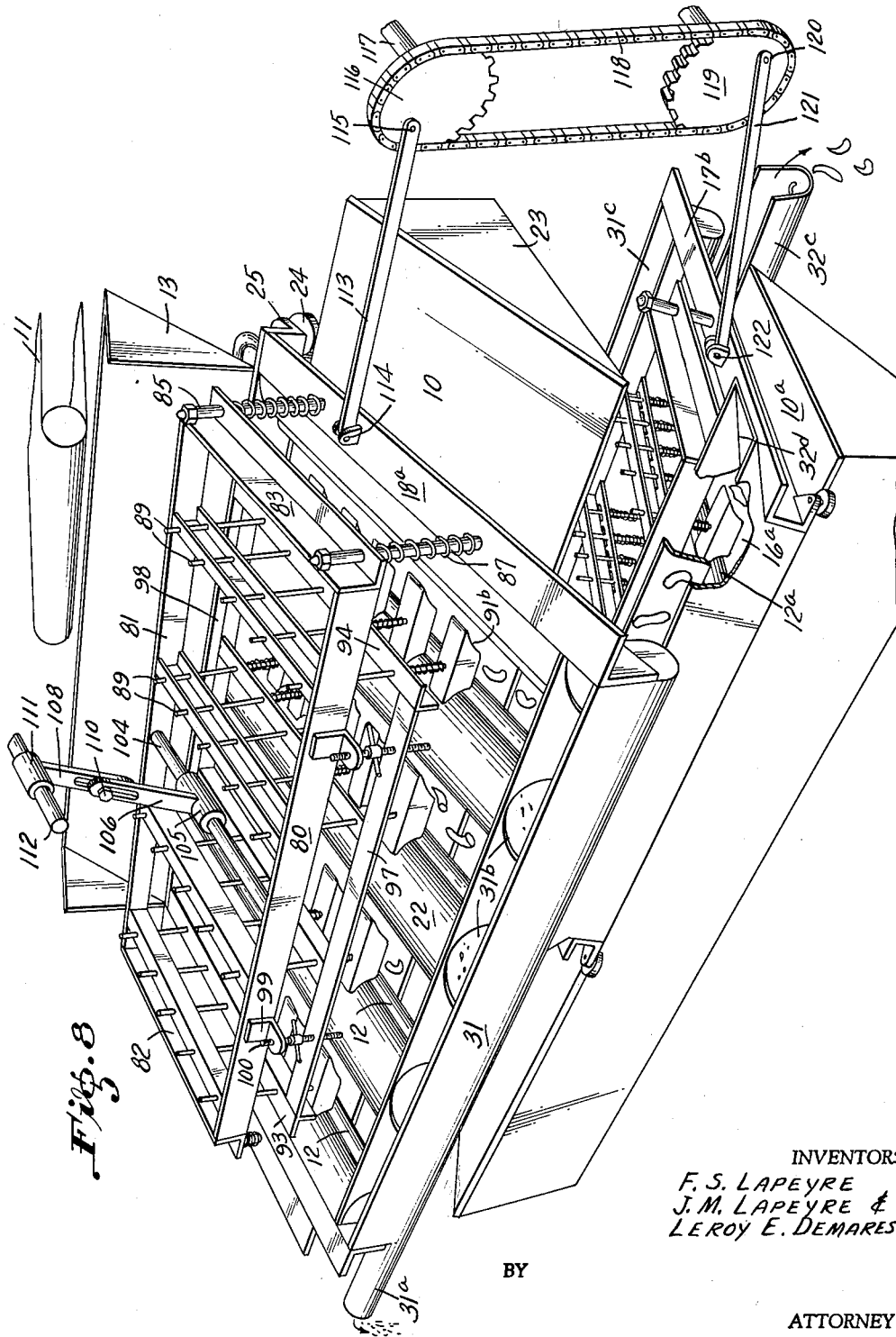

United States Patent Office 3,018,510
Patented Jan. 30, 1962

3,018,510
SHRIMP PEELING MACHINE
Fernand S. Lapeyre, James M. Lapeyre, and Le Roy E. Demarest, New Orleans, La., assignors to The Peelers Company, Houma, La., a partnership
Continuation of application Ser. No. 690,275, Oct. 15, 1957. This application Aug. 17, 1960, Ser. No. 50,556
15 Claims. (Cl. 17—2)

The present invention relates to shrimp peeling machines and is a continuation of our prior copending application Serial No. 690,275, filed October 15, 1957 (now abandoned).

In common with the objects of our application aforesaid, the present invention has for an object the expeditious shelling of the shrimp to separate the meat from the hulls and to separately deliver the shelled meat and the trash to different destinations to the end that no separating operation of trash from meat will be required subsequently to the passage of the shrimp through the machine.

It is another object of the invention to perform a peeling action upon shrimp by means of a peeling couple comprising generally a substantially rigid flat support in cooperation with a rotary roller, which latter is adapted to squeeze or pinch or unravel the shell from the shrimp, the shrimp being fed to a nip or crotch between the support and the roller by relative movement between the roller and the support, the roller also acting to partition the area of the support so as to provide a channel at one side of the roller for receiving the raw unshelled shrimp and afterwards retaining in the channel the recovered meat, while the removed shell or trash is pulled through the crotch to the opposite side of the roller to a trash disposal way, whereby the hulls and the meat are separated at opposite sides of the roller and may therefore be delivered to separate destinations, as by washing the same away to separate flumes provided for the purpose.

Preferably the rollers are mounted in pairs, being spaced apart from one another to provide the trash disposal ways therebetween with the raw shrimp and shrimp recovered meat channels being at least two in number and disposed on opposite sides of the pair of rollers.

It is a further object of the present invention to provide a shrimp peeling machine in which the support or table is inclined in the direction of the channels so as to facilitate the progress of the shrimp through the machine to increase the capacity of the machine and augment the yield of the peeled meats; and to this end it is a further object of the invention to so revise the machine of the prior copending application aforesaid that the two flumes, that is the flume for the removed hulls and trash and the other flume for the recovered meats are grouped side by side at the lower end of the channel or channels.

A still further object of the present invention is to produce a machine of the character above indicated in which pressure means are brought to bear upon the shrimp in the channels to urge the shrimp to the peeling nips or crotches and in which a novel form of mechanism is employed for moving the pressure fingers toward and from the nips of the channels, the motion of the mechanism being incidental to the relative movement between the support and rollers.

It is a further object of the invention to provide a multistage machine in which after passing through one stage the shrimp is directed to a second stage where the same is subjected to a further peeling operation, and from the second stage if desired to any number of subsequent stages, it being understood that the rollers in the various stages may be varied in diameter and/or composition to vary the angle of attack on the shrimp and to introduce other variables which will perform unraveling, pinching, squeezing and other operations upon the shrimp and will grasp the shells or hulls with efficiency to pull the same through the nips and into the disposal ways.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 4 is an isometric view of the form of invention illustrated in FIGURE 1 equipped with a pressure finger frame with means of adjustment and mechanism to move the same upwardly and downwardly.

FIGURE 5 is a vertical sectional view taken on an enlarged scale longitudinally of the machine of FIGURE 4.

FIGURE 6 is a fragmentary vertical transverse section through the two parts of the finger frame showing a finger mounted therein and a device for adjusting the pressure between the two frames and upon the finger.

FIGURE 7 is a fragmentary isometric view showing the two frames and a pressure finger mounted therein with means for preventing rotation of the finger.

FIGURE 8 is an isometric view of a multistage machine equipped with finger frames.

Figure 1:
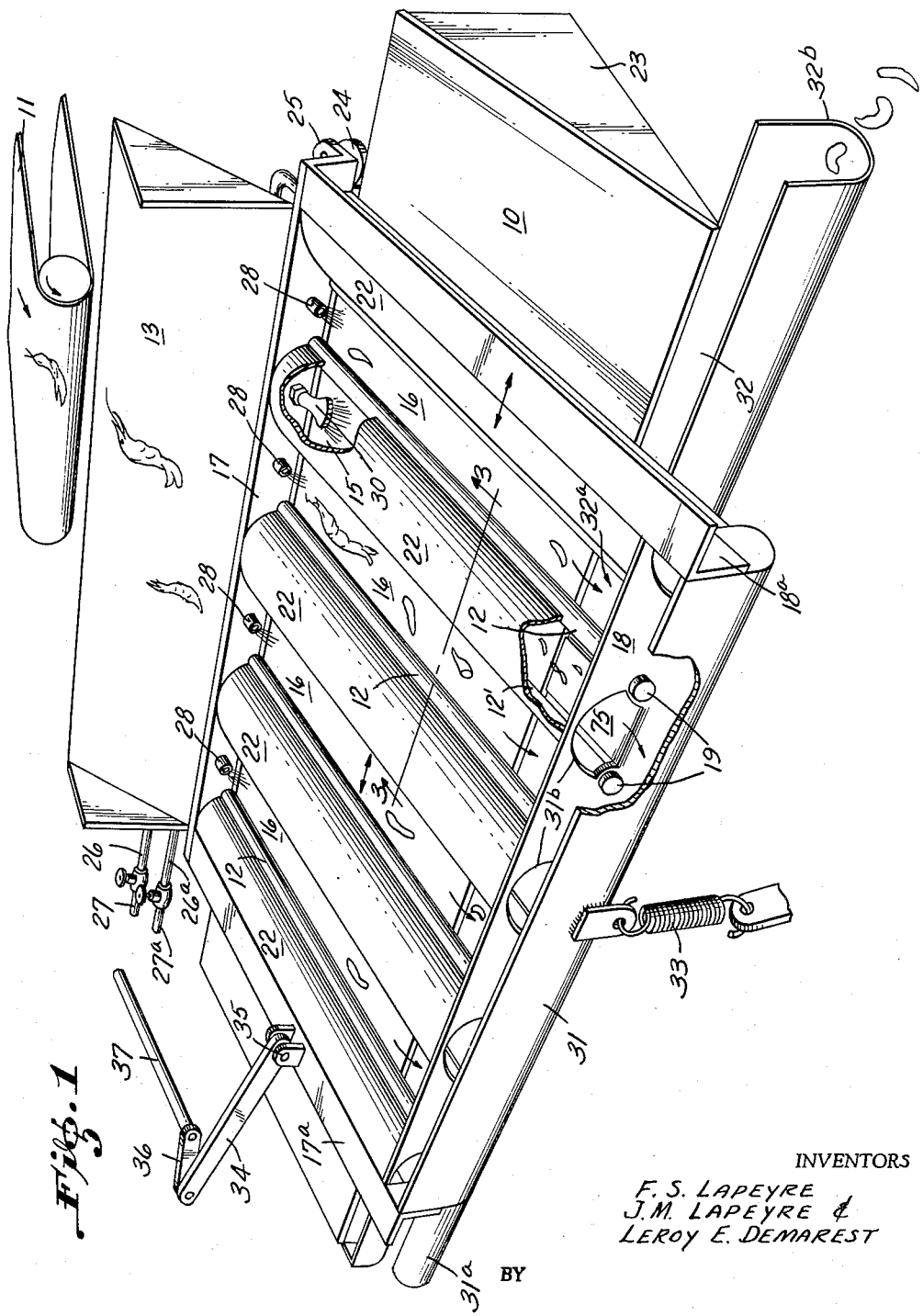
FIGURE 1 is an isometric view, with parts broken away and parts shown in section, of a shrimp peeling machine constructed in accordance with the present invention in a single embodiment thereof.

Referring more particularly to the drawings, 10 designates a table or support on to which unshelled shrimp are delivered by conveyor 11 or other device from an adjoining source of supply. The support 10 is preferably flat and rigid.

Mounted to reciprocate upon the support 10 are one or more peeling rollers 12, 12'. Preferably these peeling rollers are arranged in separated groups. Each group may consist of two units spaced apart. Each unit may consist of two rollers 12, 12'; although the units may consist of three rollers as described in the copending application aforesaid.

The rollers 12, 12' of each group are separated to provide trash disposal ways 15 therebetween, and each group is separated to provide shrimp receiving and peeling channels 16. These channels receive the raw shrimp from a feed chute 13 disposed between the conveyor 11 and the support or table 10.

The trunnions 19 of the rollers 12, 12' are journalled in side walls 17, 18, which together with the end walls 17a and 18a constitute a reciprocating roller frame. The spacing relationship between the rollers 12, 12' of each group is determined and preserved by journalling the trunnions 19 of the various rollers at suitably spaced apart points in such side walls 17, 18.

Hoods or shields arcuately or otherwise span the distance between adjacent rollers 12, 12' of each group. These hoods 22 may be located only at the receiving ends of the channels 16 adjacent the chute 13, or they may be extended throughout the entire lengths of the trash disposal ways 15, in which event such hoods or shields constitute housings 22 whereby shrimp delivered by the conveyor 11 and chute 13 falling upon the shields or housings 22 will be prevented from entering the trash disposal ways 15 and will be deflected to the channels 16.

The table or support 10, in one form of the invention, is stationary and carried by an appropriate frame 23 on which the reciprocating roller frame is appropriately mounted for reciprocating movement.

The table or support 10 is inclined or sloped from a high end adjacent the chute 13 down to troughs for collecting the trash and peeled meat at the other ends of the trash disposal ways 15 and channels 16.

The reciprocating roller frame is guided appropriately for back and forth rectilineal motion, for example, by rollers 24 carried by brackets 25 which project inwardly from the side walls 17, 18 in position for the rollers 24 to engage the side edges of the table or frame 10, 23. A suitable number of these rollers 24 is mounted along the walls 17, 18 at opposite sides of the table or support 10 in order to take up the lateral thrust, and to orient the reciprocating motion of the roller frame to avoid any local shifting thereof which might tend to bind or resist the motion.

One or more liquid manifolds 26, 26ª are carried by the reciprocating roller frame at the receiving or conveyor side 17 in communication with a source of water or other liquid supply through flexible connections 27, 27ª. Spray nozzles 28 and 30 connected to the manifolds 26, 26ª are exposed through the side wall 17 to the trash disposal ways 15 and channels 16 respectively.

A trash receiving trough 31 extends lengthwise in common to all of the trash disposal ways 15 at the lower ends thereof to receive the separated hulls or shells and may convey the same to an appropriate disposal point through the exit end 31ª of the trough. Openings 31ᵇ in the wall 18 afford communication between the lower ends of the trash disposal ways 15 and the trash receiving trough 31.

Conveniently the side wall 18, which is lowermost, may provide a common wall for the two troughs 31, 32, the peeled meat collecting trough 32 being disposed inwardly of the trash receiving trough 31. The peeled meat may fall into the trough 32 at the points 32ª. The discharge end of the trough 32 is indicated at 32ᵇ.

Coil or other springs 33 may be connected between the reciprocating roller frame and the machine bed for imposing a resilient and yielding load on the rollers.

The roller frame may be reciprocated in any desired manner, for instance by a pitman 34 pivoted to the end wall 17ª at 35, which pitman is driven by a crank arm 36. The arm 36 is made fast to a rotary shaft 37 driven by an electric or other motor or suitable source of power.

The table or support 10 may advantageously be made up of a metal or other rigid backing 10ˣ surfaced with rubber or other suitable peeling table material 10ʸ which will yield necessary friction to maintain the shrimp in peeling relation with the rollers.

Referring more particularly to FIGURES 4 to 7 inclusive, a pressure finger frame is shown to be made up of longitudinal beams 80 and 81 connected together by end transverse beams 82 and 83, the latter having outturned flanges 82ª and 83ª through which project guide posts 84 and 85 which are affixed at their lower ends to the end transverse members 17ª and 18ª of the roller frame. The posts 84 and 85 project through apertures 86 in the flanges 82ª and 83ª. The upper ends of the posts 84 and 85 are capped by heads or nuts 84ª and 85ª. Coil springs 87 are wound in a suitable number of convolutions about the posts 84 and 85 with their lower ends abutting upon the end members 17ª and 18ª of the reciprocating roller frame and the upper ends of such springs engaging beneath the flanges 82ª and 83ª of the pressure finger frame and resiliently supporting such pressure finger frame.

Channel beams 88 are connected between the longitudinal beams 80 and 81 and are substantially parallel with the end transverse beams 82 and 83, these channel beams 88 lying above the shrimp channels 16 on the support 10 or otherwise stated between the groups of the peeling rollers 12, 12'.

The channel beams 88, as more particularly illustrated in FIGURE 7, include flanges 88ª and 88ᵇ having perforations 88ᶜ and 88ᵈ for the free movement therethrough of slip rods 89 through which are engaged cross guide pins 90 for preventing the rotation of the rods 89 and also for limiting the downward movement of the rods 89 below the point shown in FIGURE 7.

To the lower ends of the slip rods 89 are secured fingers 91 having flat lower central surfaces 91ª opposing the support surface 10, these fingers 91 being located in the channels 16, that is between the roller groups 12 and 12'. The lateral faces 91ᵇ of the fingers 91 are incurved opposite the curved rollers 12 and 12'. Coil springs 92 are wound about the rods 89 abutting the fingers 91 at their lower ends and end crossbars 93 and 94 and intermediate crossbars 95 of a pressure adjustment frame which is completed by longitudinal bars 97 and 98 between which the end crossbars 93 and 94 and the intermediate crossbars 95 are connected. The crossbars are spaced apart so that one such crossbar runs the length of each channel 16. Holes 96 in the bars 93, 94 and 95 permit the free play of the rods 89 through such crossbars.

The longitudinal beams 80 and 81 of the pressure finger frame have affixed to the sides thereof angle brackets 99 having threaded openings 101 therethrough to receive the upper portions of adjusting screws 100, the lower threaded portions of which engage through threaded openings 102 in the longitudinal bars 97 and 98 of the pressure adjustment frame. The upper and lower portions of the adjusting screws 100 are oppositely threaded and may cooperate with the oppositely threaded openings 101 and 102. Control handles 103 are affixed to the adjusting screws between the angle brackets 99 and the longitudinal bars 97 and 98.

A rod 104 of external round section is connected between the longitudinal beams 80 and 81 of the pressure finger frame. Surrounding this rod is a rotary sleeve 105 from which projects upwardly an arm 106 having a slot 107 lapping a second arm 108 having a slot 109. The slots 107 and 109 receive therethrough an adjusting bolt 110. The arm 108 is affixed at its upper end to a sleeve 111 which rotates freely about affixed shaft 112 mounted in portions 23ª of the frame work.

FIGURE 8 shows a multistage machine in which two units, such as shown in FIGURE 4, are mounted one above another with the inclination of the table or support 10ª of the lower unit or section being inclined in a direction opposite to the inclination of the support 10 of the upper unit or section so that the higher ends of the shrimp and meat channels 16ª of the lower unit will be disposed directly below the lower ends of the channels 16 of the upper unit. A funnel 32ᵈ is arranged across the entire width of the lower unit at its higher end in position to catch the shrimp and meat as the same fall from the lower end of the peeling table or support 10 of the upper unit. This funnel 32ᵈ will direct the shrimp meat and partially shelled meat from the upper section down into the upper higher end of the lower unit or section and into the upper ends of the channels 16ª of the lower section whereby the meats or partially shelled shrimp may be subjected in the lower section to a second stage of the peeling operation.

The upper section is provided with a trash receiving trough 31, just as in the case of FIGURE 4 having a discharge end 31ª. The lower unit or section is preferably provided with a separate trash receiving trough 31ᶜ disposed along the width of the lower unit in position to receive trash from the trash disposal ways of the lower unit.

In the case of FIGURE 8 a single peeled meat collecting trough 32ᶜ is provided at the lower end of the channels 16ª of the lower unit, it being understood that the funnel 32ᵈ serves this function for the upper unit, but instead of disposing of the meats or partially peeled shrimp the funnel 32ᵈ introduces such meats and partially shelled shrimp into the lower unit.

The two roller frames of FIGURE 8 may be driven in any suitable manner. For instance the roller frame of the upper section may be driven by a pitman 113 which is pivoted, as indicated at 114 to the upper reciprocating roller frame end wall 18ᵃ. The pitman 113 at its other end is pivoted to a pin 115 which is eccentrically affixed to a disc or sprocket 116 which is affixed to a motor driven power shaft 117 and rotated thereby. A chain or belt 118 is connected to the disc or sprocket 116 and transmits rotary motion to a second disc or sprocket 119 having an eccentric pin 120 thereon pivoted to one end of a pitman 121 which is pivoted as indicated at 122 to the lower reciprocating roller frame end wall 17ᵇ. It will be noted from FIGURE 8 that the eccentric pins 115 and 120 occupy relatively opposite positions upon their respective discs or sprockets 116 and 119 in order to balance the thrust of the roller frames developed through the pitman 113, 121.

Figure 2:
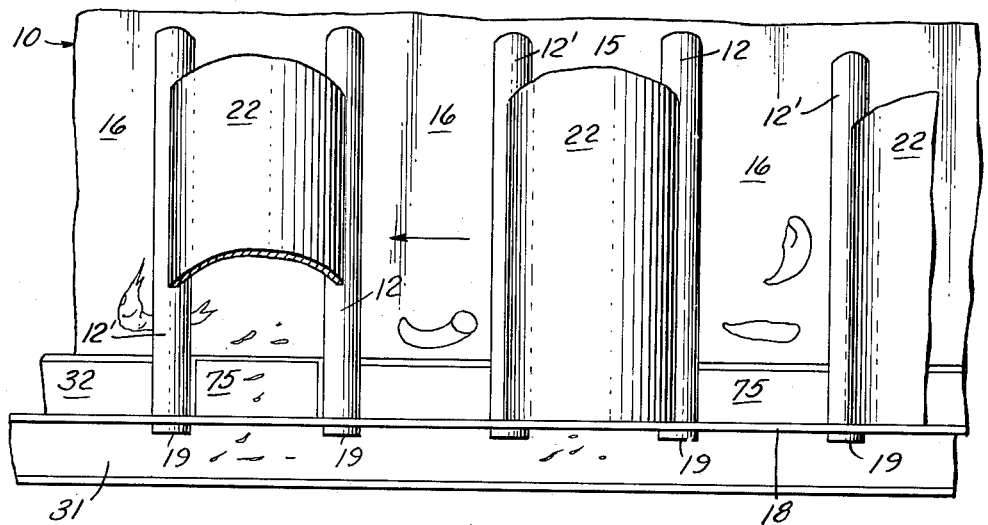
FIGURE 2 is a fragmentary top plan view, taken on an enlarged scale, of the support, flumes and channels and disposal ways.
Figure 3:
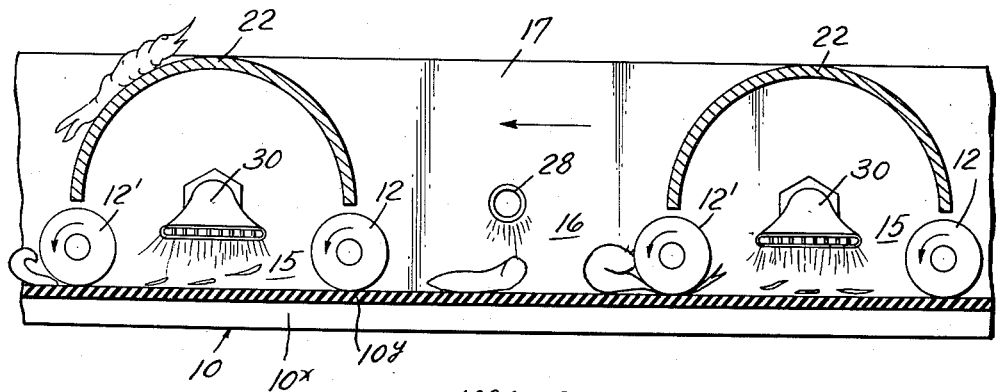
FIGURE 3 is a substantially vertical section taken on an enlarged scale on the line 3—3 in FIGURE 1.

In operation of a single unit such as shown in FIGURES 1 to 3 inclusive, raw shrimp from an appropriate source is delivered by means of the conveyor 11 onto the chute 13 by which the shrimp are directed to the higher or origin ends of the peeling channels 16 which are areas of the inclined table or support 10 between groups of the rollers 12, 12'. The origin ends of these channels 16 are adjacent the wall 17. The raw shrimp will be obliged to fall onto the table or support 10 between the groups of rollers 12, 12'. Any shrimp falling upon the shields or housings 22 which are arcuate will be deflected by such shields or housings into the channels 16. As the roller frame reciprocates, the roller groups 12, 12' will be moved back and forth along the support 10 with the peeling rollers 12, 12' in rolling contact with the upper surface of the support 10, thus forming separating or peeling nips between the rollers and support 10. The springs 32 will hold the peeling rollers 12, 12' down into rolling contact with the upper surface of the table 10 with suitable selected pressure.

As the roller frame is reciprocated, the groups of rollers 12, 12' will be given, in addition to a rotary movement about their own axes, a motion of translation back and forth along the table 10 so that the groups of rollers will be caused to move to the shrimp lying on the table or support 10 in the channels 16. As the shrimp will ordinarily be motionless on the support, at least in relation to the approaching groups of rollers, the inertia of such shrimp is taken advantage of to enable the leading peeling roller 12, 12' to engage the shrimp. The roller is in the nature of an inclined plane with a downwardly moving surface which will tend to grasp the rather rough external hull of the shrimp and cause such hull to be guided to the nip between the advancing peeling roller and the upper surface of the support as the roller group advances on the shrimp. Incident to this bodily movement of the rollers and incident to the yieldable spring pressure, the hulls of the shrimp are held in the nips between the peeling rollers and support while the meat is pinched or squeezed from the hulls and is forced outwardly therefrom by the advancing peeling rollers which pass over and flatten the hulls from which the meat has been expelled. In passing over such hulls the hulls are brought into the disposal ways 15. The emptied hulls are light and they come under the influence of the water sprays 30 which sluice the hulls down the ways 15 from wall 17 to wall 18. The inclination of the table 10 will also induce a movement of the hulls down the disposal ways 15, at the lower ends of which the hulls will pass through the openings 31ᵈ and be delivered to the trash receiving trough 31 and eventually discharged at the lower end 31ᵃ thereof.

The channels 16 and ways 15 will move back and forth with the reciprocating groups of rollers over the surface of the support 10. The water nozzles 28 and 30 and the troughs 31 and 32 and also the chute 13, all being connected to the roller frame will move back and forth with the groups of rollers.

As the roller groups reciprocate back and forth, they do not interfere with the peeled meat which is slick and slimy and which therefore escapes from the advancing peeling rollers and therefore remains in the channels 16.

While, as before stated, the shrimp in the channels do not move appreciably toward or from the groups of peeling rollers, such shrimp moves gradually through the channels 16 from the origin ends thereof adjacent the side walls 17 to the exits or terminal ends adjacent the wall 18 at which point the expelled meat and unshelled shrimp drop into the collecting trough 32 and are taken off at the end 32ᵇ thereof.

The action of peeling may be described as a pinch or squeezing operation or in some instances an unraveling operation in which an end or portion of the hull is caught in the nip between the peeling roller and the support and as the roller advances the shell is stripped from the meat as the meat is pushed forwardly of the advancing peeling roller.

In most cases it will only require a trickle of water to be delivered through the nozzles 28 to the peeling channels 16 in order to lubricate the peeling table or support 10.

The rollers 12, 12' are preferably small diameter metal or composition rollers. These rollers may be roughened if desired for better gripping of hard shells.

The water supplied through the nozzles 30 to the disposal ways 15 is preferably at higher pressure in order to blast the hulls and trash from the surfaces of the rollers 12, 12' and clear of the peeling table and into the trash flume or trough 31.

It will be understood that the reciprocating motion can be applied to the table or support 10 while the roller frame is held in affixed position as is the table in the present instance.

It is only necessary that there be relative movement between the table or support 10 and the roller frame.

The peeling table or support 10 is slanted to aid the flow of meats and water and also of the separated hulls by the action of gravity, both troughs 31 and 32 being located at the lower end of the support 10 so that the action of gravity is taken advantage of with respect not only to the meats and unpeeled shrimp but also to the hulls and the trash.

Referring to FIGURES 4 and 5, incident to the reciprocating motion of the roller frame, the finger frame will be moved up and down. This motion is partly indicated in the full and dotted lines in FIGURE 5. When the arms 106, 108 are in substantially the vertical position shown in full lines in FIGURE 5 the finger frame and fingers 91 will be pushed down to their lowermost positions in the channels 16. However when the roller frame is moved so that the radius arms 106, 108 swing to one or other side of the vertical position illustrated in full lines in FIGURE 5, the finger frame will be lifted, and incident thereto will lift the fingers 91 upwardly with respect to the table surface at the channels 16. The fingers 91 will thus be given an up and down motion. This motion affords a kneading action to the shrimp. The movement of the fingers 91 in the channels 16 also aids change of the position of the shrimp on the peeling table and assists to force the shrimp into the peeling crotches or nips. The kneading action occurs when the finger frame is lowered. When the frame lifts the shrimp are allowed to move down the inclined table. In this way they advance through the machine and also at each rise of the fingers, the shrimp may take a new position with respect to the crotches or nips between the peeling rollers and the support. Thus the peeling rollers are able to perform a peeling operation upon all portions of the shrimp and remove any shell therefrom which may be adherent to the bodies of the shrimp from a preceding peeling operation.

As the radius rods 106, 108 swing back and forth about the fixed axis 112, and the finger frame is accordingly moved up and down, the springs 87 will be compressed upon the downward movement and will thus store potential energy which becomes kinetic when the radius arms 106, 108 swing to either side of the vertical position thus raising the finger frame and the fingers 91. In other words these springs 87 are active to lift the finger frame except in those positions of the radius arms 106, 108 when approaching and retreating from the vertical full line position of FIGURE 5. The radius arms 106, 108 force the finger frame downwardly. The springs 87 lift the frame when the downward thrust of the radius arms is removed by the motion of the roller frame toward opposite ends of its movement. The effective thrust length between 104 and 112 may be adjusted by lengthening or shortening the length of the radius arms 106, 108 through the adjusting bolt 110.

Such adjustment will change the lowermost position which the fingers 91 assume to the table or support 10 in the lowermost position of the finger frame. This also adjusts the degree of thrust exerted by the fingers 91 upon the shrimp in the peeling crotches.

It will also be noted that each individual finger 91 is subject to its own individual spring load through the coil springs 92 which will permit an arrest in the downward motion of any particular finger 91, with the finger frame and pressure adjustment frame sliding relatively down upon the finger rod 89. This will prevent a forcing action of the fingers upon large shrimp which would otherwise damage the shrimp and devaluate the meat. It will be understood that the coil springs 92 are under compression and this compression is retained by the pins 90 engaging upon the lower flanges 88$^b$ of the channel beams 88. These pins 90 also act to lift the fingers 91 on the rising movement of the finger frame. As before stated the pins 90 also prevent any very great rotation of the rods 89 or fingers 91 which would permit the fingers to turn to any extent in the channels 16.

It will be understood that the pivot point 112 is rigidly fixed in space as a part of the main structure. This point must remain fixed throughout reciprocation of the roller frame.

The radius arm has a slide adjustment to permit regulation of clearance between fingers and peeling table when finger frame is fully depressed.

The adjusting screws 100 permit moving of the pressure adjustment frame up and down with respect to the finger frame thus adjusting the tension or compression upon the springs 92. This is attended with a corresponding increase or a decrease in pressure of the fingers on the meats.

The kneading action referred to operates to loosen the adherence of the shell to the meat. The finger frame and its pressure adjustment frame will rise and fall in synchronism with the reciprocating motion of the roller frame. When the frame is raised, the shrimp are allowed to move more freely down the inclined peeling table.

In connection with the operation of FIGURE 8, the peeling rollers in the upper section are preferably metal or hard surfaced and of smaller diameter, while the peeling rollers 12$^a$ in the lower unit or section are larger and softer, for instance they may be of soft rubber or covered with soft rubber. The small rollers in the top unit of the machine reduce mutilation of the meats. The larger, softer rollers in the second stage will exert a more positive grab upon the shells of unpeeled shrimp.

In the claims, the words "substantially rigid" referring to the support 10 mean that the support will possess sufficient stability, even when covered with a rubber material 10$^y$ to take the thrust of the rollers in the act of pinching or squeezing or unraveling shrimp.

Although we have disclosed herein the best form of the invention known to us at this time, we reserve the right to all such modifications and changes as may come within the scope of the following claims.

What is claimed is:

1. A machine for separating the hulls from the meat of shrimp comprising a shrimp support including a substantially flat surface supporting the shrimp during the separating operation, spaced rotary separating members positioned relatively to the flat surface to form separating nips, means associated with one of said members and said support to cause relative bodily reciprocatory movement between said members and said flat surface of said support whereby to separate the hulls from the meat of said shrimp, said shrimp support being inclined, means at the high end of the support for introducing raw shrimp thereto, and means at the lower end of the inclined shrimp support for receiving the peeled meat and the separated hulls.

2. A machine for separating the hulls from the meat of shrimp comprising a substantially rigid flat shrimp supporting and separating member, at least one other separating member positioned relatively to the flat member to form a separating nip, means associated with one of said members to cause relative bodily rectilinearly reciprocatory movement between said members whereby to separate the hulls from the meat of said shrimp, said flat rigid shrimp supporting and separating member being inclined, means at the high end of the first member for introducing raw shrimp thereto, and means at the low end of said first member positioned to receive the peeled meat and separated hulls.

3. A shrimp peeling machine comprising a substantially rigid flat peeling support member for shrimp, at least one rotary peeling member in operative peeling association with said rigid flat support for peeling the shrimp between said rigid flat support and said rotary peeling member, said rotary peeling member having an axis of rotation fixed against angular movement, means associated with one of said members to cause relative bodily movement between said members for placing the members and shrimp in shrimp peeling position whereby the shrimp are peeled on said rigid flat support, said rigid flat support member being inclined, means at the high end of the support member for introducing raw shrimp thereto, and separate discharge means for the hulls and peeled meat grouped at the lower end of said support member.

4. A shrimp peeling machine comprising a substantially rigid flat peeling support member for shrimp, at least one rotary peeling member in operative peeling association with said rigid flat support for peeling the shrimp between the said rigid flat support and said rotary peeling member, said rotary peeling member defining on the support member trash disposal and peeled meat ways, means associated with one of said members to cause relative bodily movement between said members for placing the members and shrimp in shrimp peeling position whereby the shrimp are peeled on said rigid flat support member, said flat support member being inclined, means at the higher end of the support member for introducing raw shrimp to the peeled meat way, a trough for the peeled meat extending along the lower end of said support member in communication with the peeled meat way, and a second separated trough also extending along the lower side of said support member and in communication with the trash disposal way for separately carrying off the removed hulls.

5. The machine of claim 4 further comprising means at the high end of the support to direct fluid to the ways in directions towards the troughs.

6. A shrimp peeling machine comprising a first member constituting a shrimp support and peeling means, a second peeling member positioned relatively to the first member to peel shrimp therewith and also to partition the area of the support into trash and peeled shrimp ways, means connected to bodily move one member relative to the other member whereby the ways progress along successive areas of the first member incident to the peeling and separating action of the members, said first member being inclined, means at the high end of the support for introducing raw shrimp to the upper end of the peeled shrimp way, and disposal means for removing the peeled meat and trash from said ways, said disposal means located at the lower end of said inclined first support member.

7. A shrimp peeling machine comprising a first member constituting a shrimp support and peeling means, a second peeling member positioned relatively to the first member to peel shrimp therewith and having spaced peeling means to partition the area of the support into a trash way between the spaced peeling means and peeled shrimp ways in front and rear of the second member, means connected to one member to bodily move said member back and forth relative to the other member whereby the ways progress along successive areas of the first member incident to the peeling and separating action of the members, said first member being inclined, means at the high end of the support for introducing raw shrimp to the high end of the peeled shrimp ways, and separate disposal means at the low end of said first member in communication separately with the trash way and peeled shrimp ways for removing the trash and peeled meat from said ways.

8. A shrimp peeling machine comprising a first member constituting a shrimp support and peeling means, a second peeling member positioned relatively to the first member to peel shrimp therewith, means connected to one member to bodily move said member relatively to the other member to perform a peeling operation between the two members, pressure means movable with the movable member having also a second movement toward and from the peeling zone between the two members whereby in one position to urge the shrimp into said zone and in another position to withdraw to leave the shrimp free to move along the first member, and actuating means for causing said second movement of the pressure means, said actuating means connected with the movable member to derive its movement therefrom.

9. A shrimp peeling machine comprising a first member constituting a shrimp support and peeling means, a second peeling member positioned relatively to the first member to peel shrimp and having a peeling nip with said first member, means connected to one member to bodily move the same relatively to the other member to effect a peeling action on the shrimp between the members, pressure means carried by and movable with the movable member and also having a movement relatively to the movable member toward and from the nip, and actuating means for the pressure means connected between the machine and the movable member for moving the pressure means toward and from the nip incident to the movement of the movable member.

10. A shrimp peeling machine comprising a first member constituting a shrimp support and peeling means, a second peeling member positioned relatively to the first member to peel shrimp and having a nip formed together with the first member, means connected to one member to bodily move the same relatively to the other member to peel the shrimp, pressure means, a pressure frame carrying said pressure means and itself carried by said movable member and having a second movement for moving the pressure means toward and from said nip, and actuating means connected between a fixed portion of the machine and said frame for moving the frame and pressure means toward and from the nip incident to the movement of the movable member.

11. A shrimp peeling machine comprising a first member constituting a shrimp support and peeling means, a second peeling member positioned relatively to the first member to form a nip therebetween for the peeling of the shrimp, means connected to one member to bodily move the same relative to the other member whereby to peel the shrimp, pressure means mounted to move with the movable member and also having a second movement angularly to the movement of the movable member whereby the pressure means move toward and from the nip, and actuating means for causing the second movement of the pressure means, said actuating means connected to a fixed portion of the machine and also with a part movable with the movable member, said actuating means including adjustment means for varying the degree of the second movement of the pressure means whereby to vary the degree of pressure imposed on the shrimp at the nip.

12. A shrimp peeling machine comprising a substantially rigid flat support for the shrimp, a reciprocating roller frame having rollers rolling on the support and forming peeling nips therewith, pressure means carried to reciprocate with the roller frame and also having a second movement angularly to the direction of reciprocating movement of the roller frame whereby to move toward and from the nips, a pressure frame carrying said pressure means, mounted to move with said reciprocating roller frame and also having a movement toward and from the nips, a fixed part carried by the machine, and an adjustable radius arm connected between said fixed part and the pressure frame and oscillating incident to the reciprocating motion of the roller frame and pressure frame and incidentally causing the second movement of the pressure frame.

13. A machine for separating the hulls from the meat of shrimp and the like comprising at least two separating members associated together to form a peeling couple, one of the members having a movement of translation relatively to the other member, and pressure means movable with the translatory member and relatively across the said other member to perform a kneading operation on the shrimp.

14. A machine for separating the hulls from the meat of shrimp and the like comprising a separating member having an inclined substantially flat surface, and an axially elongated pressure member having a movement across the flat surface to engage shrimp therebetween to alternately press the shrimp against the flat surface and release the shrimp to take up a new position to perform a kneading operation thereon and to thereby remove the hulls from the meat.

15. A machine for separating the hulls from the meat of shrimp and the like comprising a separating member having an inclined substantially flat surface, and an axially elongated pressure member having a movement across the flat surface to engage shrimp therebetween to perform a kneading operation on the shrimp to loosen and remove the hulls from the meat, a pressure frame carrying said pressure member, means connected to the frame to reciprocate the frame substantially parallel to the flat surface, and means connected to the frame to reciprocate the frame toward and from the flat surface.

References Cited in the file of this patent

UNITED STATES PATENTS

| | | |
|---|---|---|
| 2,537,355 | Lapeyre et al. | Jan. 9, 1951 |
| 2,574,044 | Lapeyre et al. | Nov. 6, 1951 |
| 2,637,065 | Lapeyre et al. | May 5, 1953 |
| 2,781,544 | Skrmetta | Feb. 19, 1957 |